US009039337B2

(12) United States Patent
Babinchak

(10) Patent No.: US 9,039,337 B2
(45) Date of Patent: May 26, 2015

(54) LIFTING MEMBER EDGE PROTECTOR

(71) Applicant: LIFT-ALL COMPANY, INC., Landisville, PA (US)

(72) Inventor: Gregory S. Babinchak, Elizabethtown, PA (US)

(73) Assignee: Lift-All Company, Inc., Landisville, PA (US)

( * ) Notice: Subject to any disclaimer, the term of this patent is extended or adjusted under 35 U.S.C. 154(b) by 0 days.

(21) Appl. No.: 14/205,773

(22) Filed: Mar. 12, 2014

(65) Prior Publication Data

US 2014/0262925 A1 Sep. 18, 2014

Related U.S. Application Data

(60) Provisional application No. 61/784,293, filed on Mar. 14, 2013.

(51) Int. Cl.

*B60P 7/08* (2006.01)
*B66C 1/12* (2006.01)
*B65D 71/04* (2006.01)

(52) U.S. Cl.

CPC ................ *B66C 1/122* (2013.01); *B65D 71/04* (2013.01)

(58) Field of Classification Search

CPC ................................ B65D 71/04; B66C 1/122
USPC ............ 410/39, 40, 41, 97, 99, 155; 206/453, 206/586; 248/345.1
See application file for complete search history.

(56) References Cited

U.S. PATENT DOCUMENTS

| | | | |
|---|---|---|---|
| 2,793,904 | A | 5/1957 | Gale |
| 3,747,341 | A | 7/1973 | Davis |
| 4,011,632 | A | 3/1977 | MacDonald |
| 4,877,673 | A | 10/1989 | Eckel et al. |
| 5,098,143 | A | 5/1992 | Hill |
| 5,114,101 | A | 5/1992 | Stern et al. |
| 6,019,336 | A * | 2/2000 | Havens |
| 6,611,995 | B2 | 9/2003 | Jackson et al. |
| 7,014,905 | B1 | 3/2006 | Linton |

* cited by examiner

*Primary Examiner* — Stephen Gordon
(74) *Attorney, Agent, or Firm* — McNees Wallace & Nurick LLC

(57) ABSTRACT

An edge protector for insertion between a load to be lifted and a lifting member which facilitates the lifting of the load, preventing damage to either the load or the lifting member. The edge protector has a pair of flanges which extend from a radiused or curved center portion. Each flange has an inner surface and an outer surface. A portion of each respective outer surface of each flange is spaced from and is essentially parallel to the inner surface of the respective flange.

18 Claims, 9 Drawing Sheets

LIFTING MEMBER EDGE PROTECTOR

CROSS-REFERENCE TO RELATED APPLICATION

This application claims priority to U.S. Provisional Application No. 61/784,293 filed Mar. 14, 2013, entitled "LIFTING MEMBER EDGE PROTECTOR" which is hereby incorporated by reference in its entirety.

FIELD OF THE INVENTION

The present invention is directed to a device for insertion between a load to be lifted and a lifting member, such as, but not limited to a sling or strap, which facilitates the lifting of the load. In particular the present invention is directed to a device with is positioned on an edge of the load which cooperates with the load and the lifting member to prevent damage to either the load or the lifting member.

BACKGROUND OF THE INVENTION

Edge protectors for insertion between a load to be lifted and a chain, wire, sling, hoist or other lifting device, are well-known in the art, as shown for example in U.S. Pat. Nos. 2,793,904, 3,747,341, 4,011,632 and 5,114,101. Many of these protectors are designed to protect the load and the lifting device from abrasion during a load lifting operation.

In addition, strapping systems are widely used for packaging articles, retaining articles on pallets used in shipping and storage. The articles are provided with edge protectors to prevent deterioration of the edges or the article by the straps and to prevent damage to the straps. These edge protectors are also interposed between the article and the strap to properly protect the article and the strap.

U.S. Pat. No. 4,877,673 discloses and edge protector having an L-shaped extruded edge-protector section for the strapping of articles. The edge protector is configured to protect both the article and the strap from damage.

U.S. Pat. No. 7,014,905 illustrates a wear pad for insertion between a load to be lifted and a lifting device, such as a chain or wire cable of a crane, hoist or other lifting device, containing a cylindrical-shaped edge protector with a cut out section and raised edges on the outside surface of each cylindrical end of the edge protector, which edges extend around the circumference of the edge protector. The wear pad may further include an attachment element for attaching the edge protector to the load being lifted by the lifting device, such as a magnet. The wear pad is used for protecting the load and the chain, wire cable, rope, band or strap used for lifting from damage while the load is being lifted.

While these devices are useful to assist in strapping articles and lifting of loads, improvements in such edge protectors are still necessary. Accordingly, it is an object in the invention to provide an improved edge protector which protects the article or load and the sling or other lifting device, and which is easy to use and cost effective to manufacture.

These and other objects can be obtained by the edge protector claimed in the claims and which is represented by the illustrative embodiment recited in the following specification and illustrated in the accompanying drawings.

SUMMARY OF THE INVENTION

An embodiment is directed to an edge protector for insertion between a load to be lifted and a lifting member. The edge protector has a load bearing, extruded compression member having a pair of flanges which extend from a radiused or curved center portion. Inner surfaces of the flanges are oriented essentially perpendicular to each other. A sling retaining end cap is affixed to each end of the compression bar.

An embodiment is directed to an edge protector for insertion between a load to be lifted and a lifting member. The edge protector has a load bearing, extruded compression member having a pair of flanges which extend from a radiused or curved center portion. Each flange has an inner surface and an outer surface. A portion of each respective outer surface of each flange is spaced from and is essentially parallel to the inner surface of the respective flange. Recesses are provided in flanges, each of the recesses extends from the inner surface toward the outer surface.

An embodiment is directed to an edge protector for insertion between a load to be lifted and a lifting member. The edge protector has a load bearing, extruded compression member having a pair of flanges which extend from a radiused or curved center portion. Inner surfaces of the flanges are oriented essentially perpendicular to each other. End retainers are positioned proximate the ends of the edge protector. The end retainers cooperate with the lifting member to prevent the lifting member from sliding off of the edge protector. Securing strip attachment members extend from the end retainers. The securing strip attachment members are configured to receive securing strips. The securing strips attached to the securing strip attachment members of the edge protector prevents the lifting member from being removed from the edge protector, such that when pressure has been released from the lifting member, the edge protector is removed from the load but remains in proximity with the lifting member.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
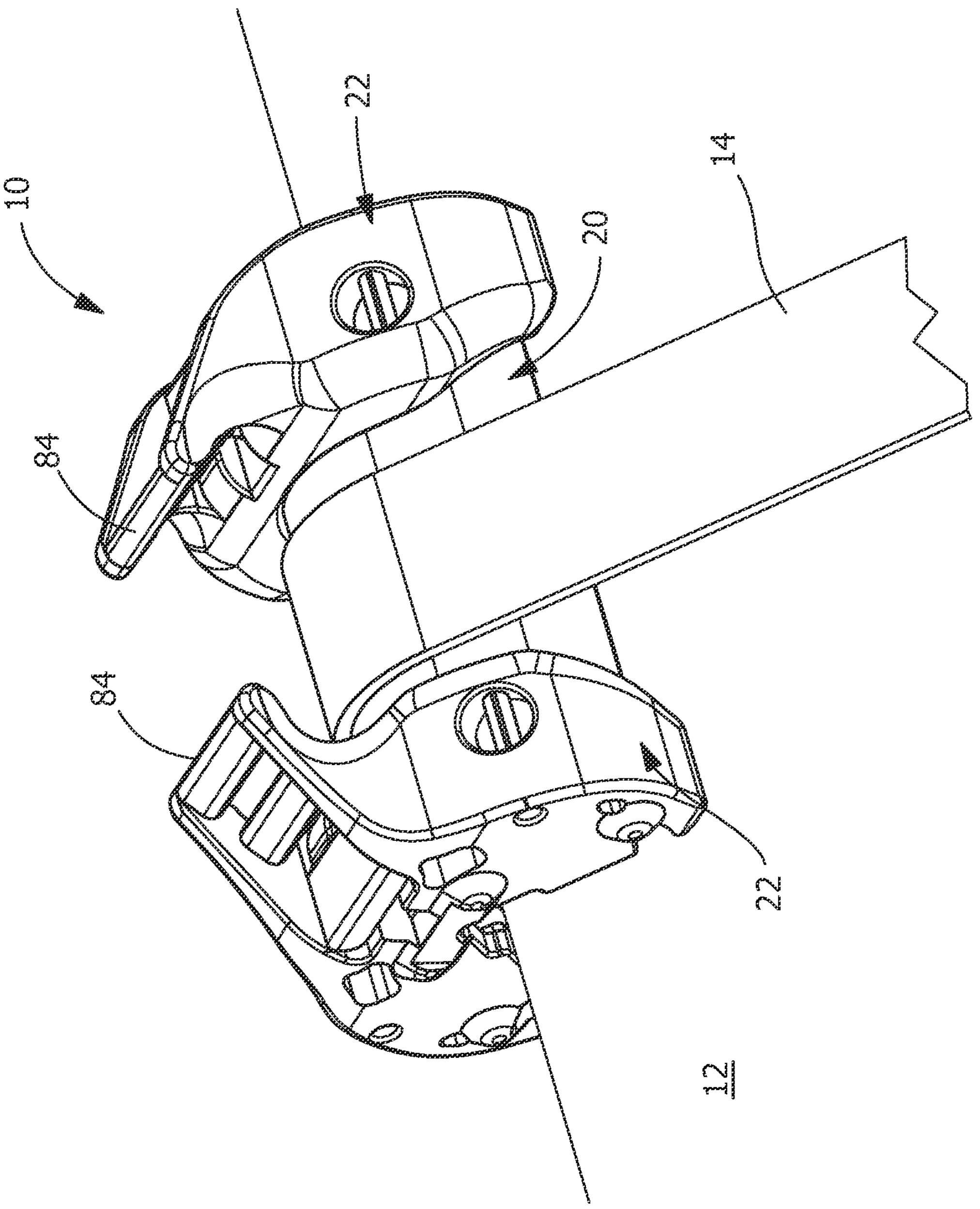
FIG. 1 is a partial perspective view of an illustrative load with an illustrative edge protector positioned between the load and a sling.
Figure 2:
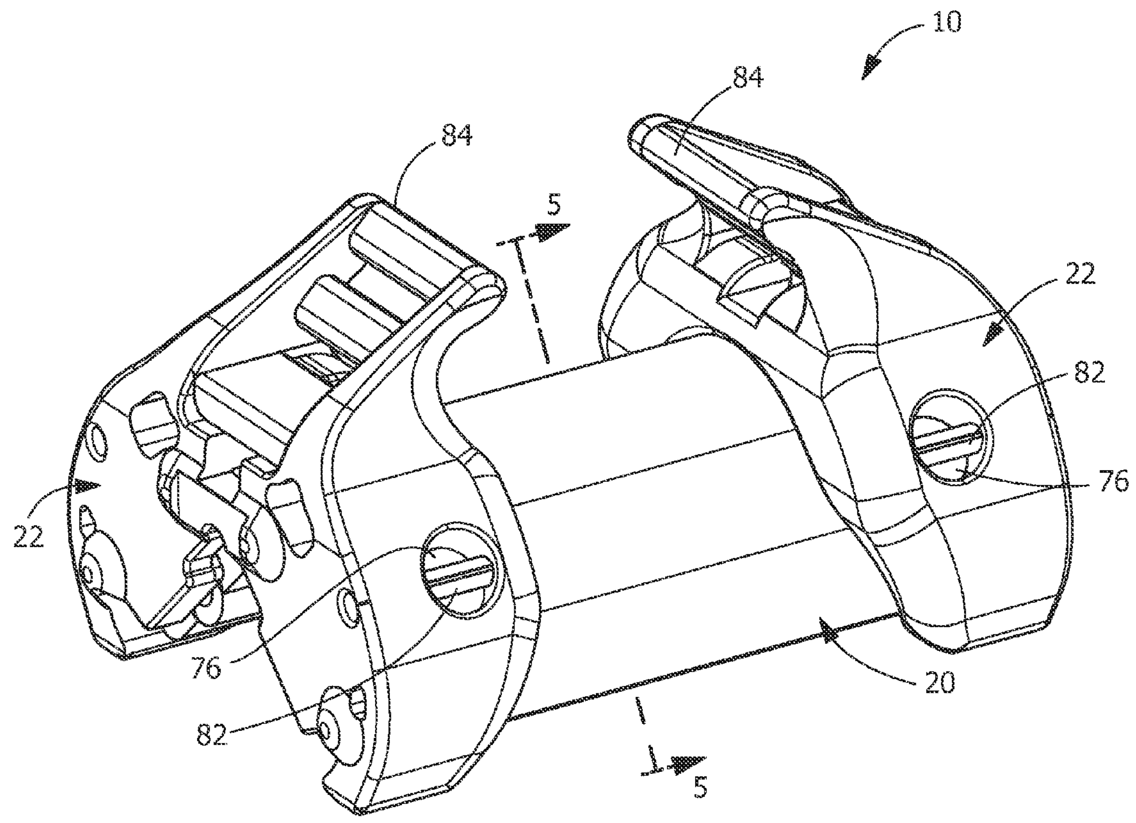
FIG. 2 is a side perspective view of the illustrative embodiment of the edge protector shown in FIG. 1.

Referring to FIG. 1, an edge protector 10 is positioned on a load 12, such as, but not limited to, equipment, article, containers, boxes, or items on a pallet. In the illustrative embodiment shown the edge protector 10 is positioned on a corner of the load 12. The edge protector 10 protects both the container

10 and a lifting member 14, such as, but not limited to a sling or strap used to lift the load 12.

Referring to FIGS. 2 through 5, the edge protector 10 includes a center member 20 and two end caps or end retainers 22. In the illustrative embodiment shown, the center member 20 is a load bearing, extruded compression member or bar made from a single extruded piece. However, the center member 20 may be molded, stamped and formed or made using other known methods. Additionally, the center member 20 may be made from more than one piece. The center member 20 is made from material such as, but not limited to aluminum or any other material having the appropriate tensile strength to withstand the loads exerted thereon by the lifting member 14. The end caps or end retainers 22 may be molded from any material having the appropriate strength characteristics required. Alternatively, the end caps or end retainers 22 may be formed using known methods about the center member 20.

Figure 3:
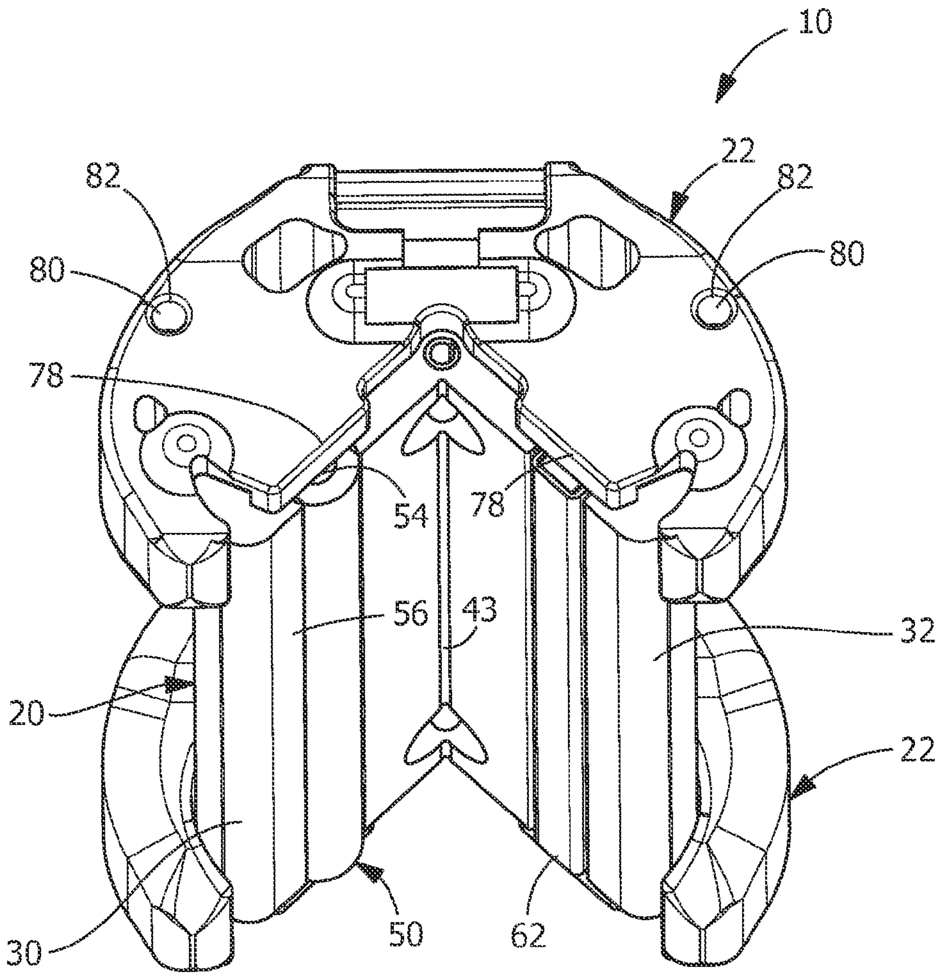
FIG. 3 is a bottom perspective view of the illustrative embodiment of the edge protector shown in FIG. 1.
Figure 4:
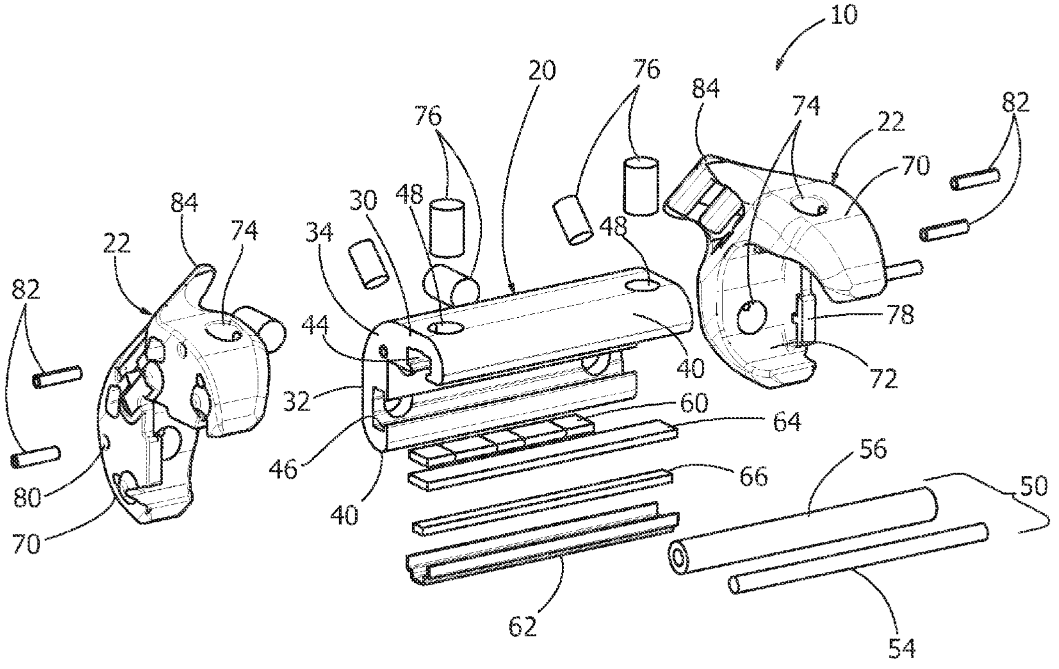
FIG. 4 is an exploded perspective view of the edge protector of FIG. 1.
Figure 5:
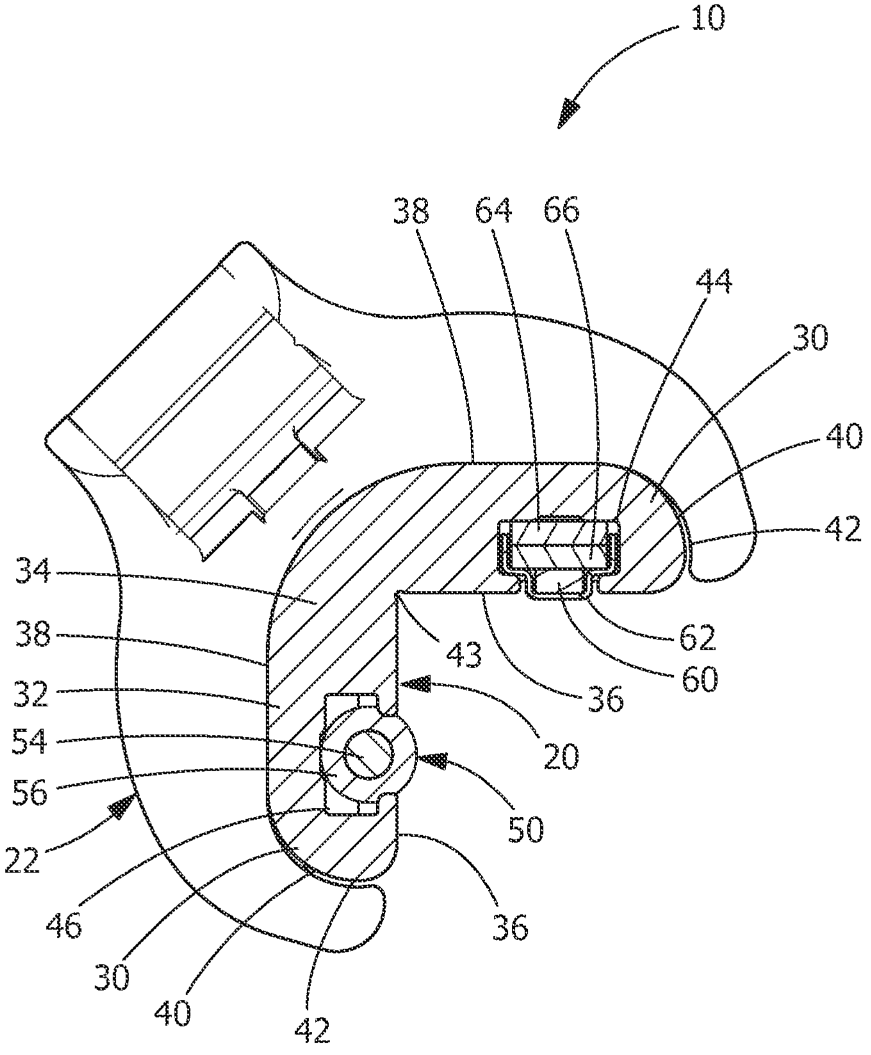
FIG. 5 is a cross-sectional view of the edge protector taken along lines 5-5 of FIG. 2.
Figure 6:
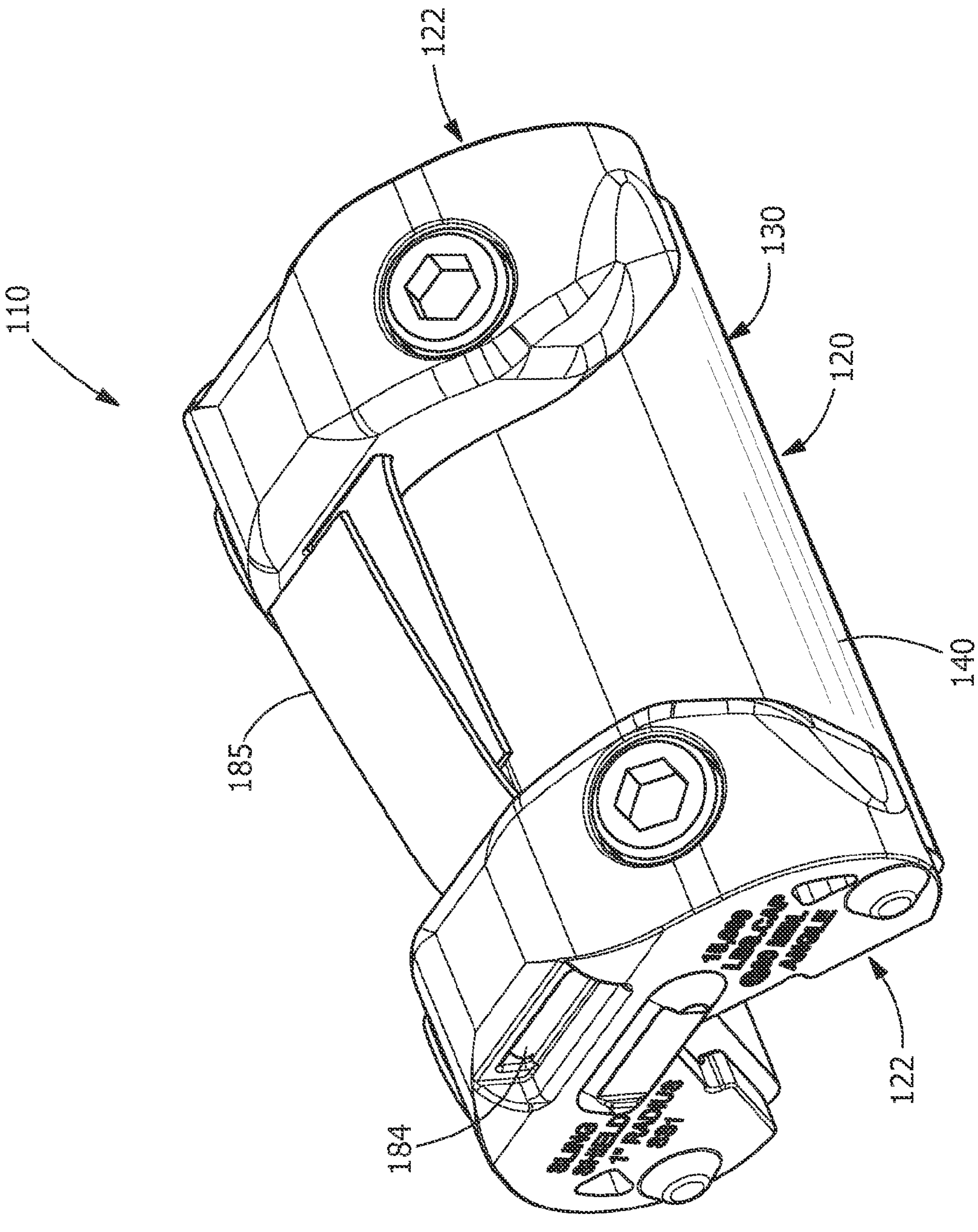
FIG. 6 is a side perspective view of an alternate illustrative embodiment of the edge protector shown in FIG. 1.

As best shown in FIGS. 3 through 5, the center member 20 has a pair of flanges 30, 32 which extend from a curved or radiused center portion 34. In one illustrative embodiment, the radiused or curved center portion 34 has a radius of at least 3/16 of an inch. In another illustrative embodiment, the radiused or curved center portion 34 has a radius not larger than 2 inches.

Each flange 30, 32 has an inner surface 36 and an outer surface 38. A portion of the outer surface 38 of each flange 30, 32 is spaced from and is essentially parallel to inner surface 36 of the respective flange. An arcuate or slopped surface 40 is provided proximate a free end 42 of each flange 30, 32. The slopped surface 40 extends from the outer surface 38 to the inner surface 36. The inner surfaces 36 of the respective flanges 30, 32 intersect at point or line 43 (as best shown in FIGS. 3 and 5). In one illustrative embodiment, the distance between the outside surface of the radiused or curved center portion 34 and the point or line 43 is equal to approximately one-half of the length of the outer surface of the radiused or curved center portion 34.

Recesses or cavities 44, 46 are provided in flanges 30, 32. In the embodiment shown, the recesses 44, 46 extend from the inner surface 36 toward the outer surface 38. The recesses 44, 46 extend the entire length of each flange 30, 32, although other configurations can be used without departing from the scope of the invention. Openings 48 (FIG. 4) are provide at either end of the center member 20. The openings extend through the outer surface 38 and through the inner surface 36 or a respective recess 44, 46, depending upon the location of the openings 48.

An insert 50 or an attachment member 52 may be provided in either or both recesses 44, 46. The insert 50 may be made from any material having the appropriate strength and resilient characteristics desired, such as, but not limited to, rubber. The insert 50 provides a resilient surface which cooperates with and engages the load 12 while providing sufficient resiliency to conform to the load, thereby helping to prevent damage to the load 12. In the embodiment shown, insert 50 is made using flexible tubing which extends essentially the entire length of the respective recess 44 and has an inner rubber core 54 and an outer plastic cover 56. However, other configurations of the insert 50 or flexible tubing can be used without departing from the scope of the invention.

The attachment member 52 may have magnetic characteristics which cooperate with various loads 12 to maintain the edge protector 10 in position prior to securing the lifting member 14 thereto. In the embodiment shown in FIG. 4, the attachment member 52 extends essentially the entire length of the respective recess 46 and has one or more magnets 60 which may be periodically spaced, a contact plate 62, a first filler bar 64 and a second filler bar 66. However, other configurations of the attachment member 52 can be used without departing from the scope of the invention.

Various configurations of the center member 20, the inserts 50 and attachment members 52 may be used without departing from the scope of the invention. For example, inserts 50 may be provided in both recesses. Alternatively, attachment members may be provided in both recesses. Alternatively, an insert may be provided in one recess and an attachment member may be provided in the other recess.

Each end cap or end retainer 22 is positioned proximate the ends of the center member 20 of the edge protector 10. As best shown in FIGS. 3 through 5, each end cap or end retainer 22 has a main body portion 70 with a recess 72 for receiving an end of the center member 20 therein. Openings 74 are provided in the body portion 70, the openings 74 configured to receiving dow rods 76 therein. The dow rods 76 cooperate with openings 48 of the center member and the openings 74 of the end cap or end retainer 22 to maintain the end cap or end retainer 22 in position on the center member 20.

End projections 78 extend from the body portion 70. The end projections cooperate with the center member 20 to prevent the unwanted movement of the center member 20 relative to the end cap or end retainer 22 in the direction of the longitudinal axis of the center member 20. Spring pins 80 may extend through openings 82 of the end projections 78 to provide further stability to the edge protector 10.

Securing strip attachment members 84 extend from the body portion 70. The attachment members 84 extend above the center member 20 and are configured to receive securing strips (not shown) therethrough. The securing strips is used to attach the lifting member 14 to the edge protector 10. This allows for ease of location of the edge protectors 10 when removed from the load 12. Many different configurations of the attachment member 84 can be used to allow the securing strips to cooperate therewith.

In operation, the inner surfaces 36 of the flanges 30, 32 of the edge protector 10 are placed proximate the load 12. In various embodiments, the edge protector 10 is held in place against the load by the attachment member 52. The lifting member 14 is then placed against the outer surface 38 of the edge protector 10 and tightly secured in position. The radiused or curved center portion 34 and the arcuate surfaces 40 prevent the lifting member 14 from being cut or damaged, as no sharp surfaces are present on the edge protector 10 which will engage the lifting member 14. The end retainers 22 located at each end of the edge protector 10 prevent the lifting member 14 from sliding off of the edge protector 10, thereby preventing damage to the lifting member 14 and the load 12. Once the load has been lifted to the particular desired location and the pressure is taken off of the lifting member 14, the edge protector 10 can be removed and reused. In various embodiments, the securing strips attached to the securing strip attachment members 84 of the edge protector 10 may prevent the lifting member 14 from being removed from the edge protector 10, such that when the pressure has been released from the lifting member 14, the edge protector 10 is removed from the load 12 but remains in proximity with the lifting member 14.

The edge protector 10 is configured to have a low profile to be inserted between a load 12 to be lifted and a lifting member 14, thereby facilitating the lifting of the load while not requiring significant additional space to be provided between adjacent loads. The edge protector 10 prevents damage to both the load 12 and the lifting member 14.

Referring to FIGS. 6 through 9, the edge protector 110 includes a center member 120 and two end caps or end retainers 122. In the illustrative embodiment shown, the center member 120 is a load bearing, extruded compression bar made from a single extruded piece. However, the center member 120 may be molded, stamped and formed or made using other known methods. Additionally, the center member 120 may be made from more than one piece. The center member 120 is made from material such as, but not limited to aluminum or any other material having the appropriate tensile strength to withstand the loads exerted thereon by the lifting member 14. The end caps or end retainers 122 may be molded from any material having the appropriate strength characteristics required. Alternatively, the end caps or end retainers 122 may be formed using known methods about the center member 120.

Figure 7:
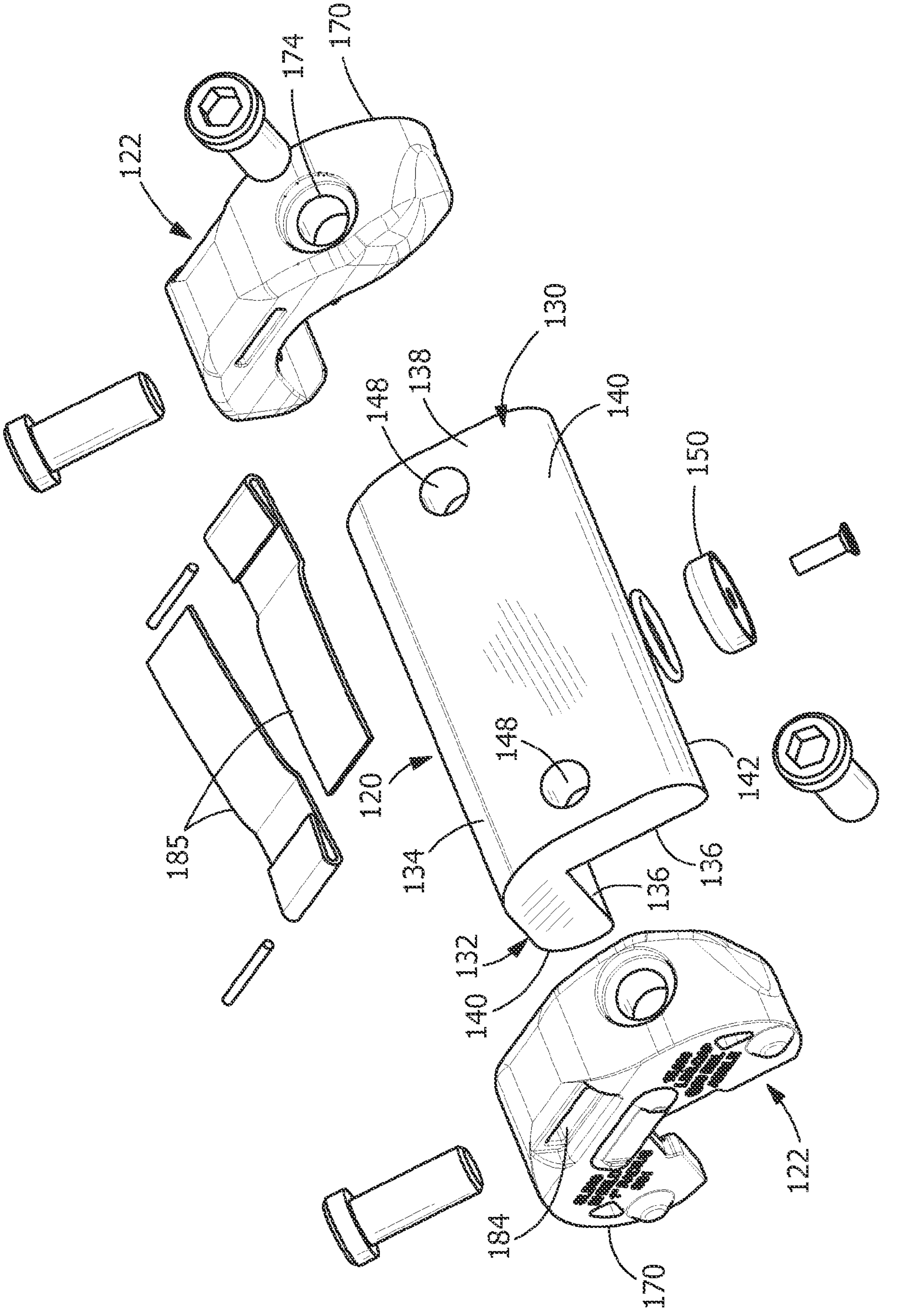
FIG. 7 is an exploded perspective view of the edge protector of FIG. 6.
Figure 8:
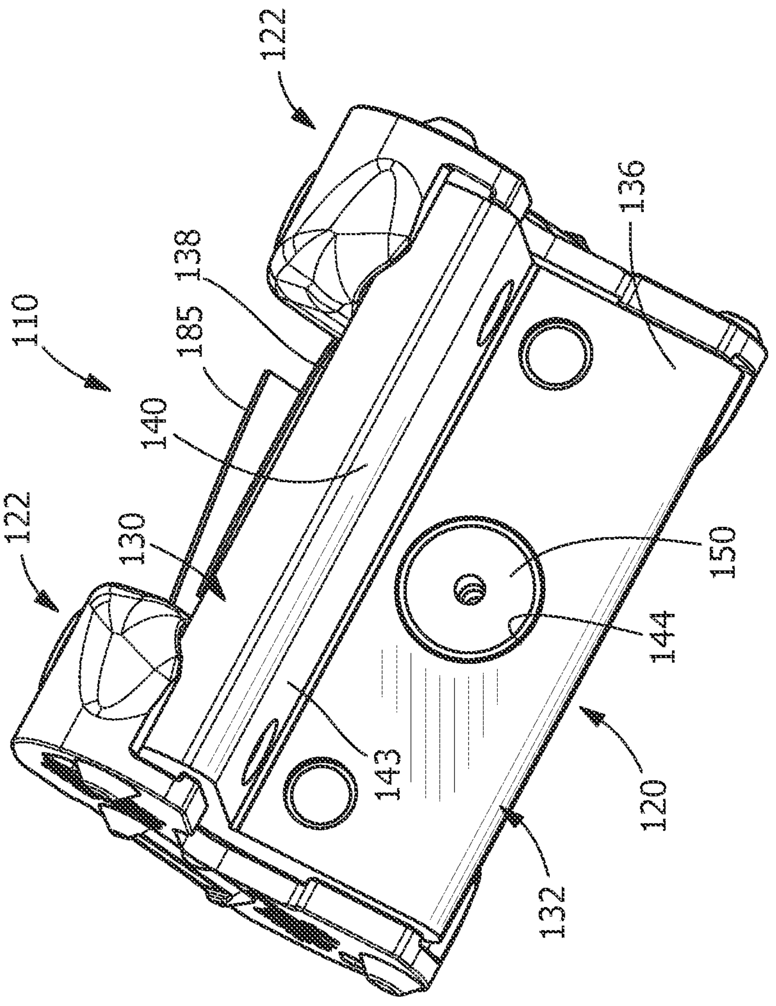
FIG. 8 is a bottom perspective view of the illustrative embodiment of the edge protector shown in FIG. 6.
Figure 9:
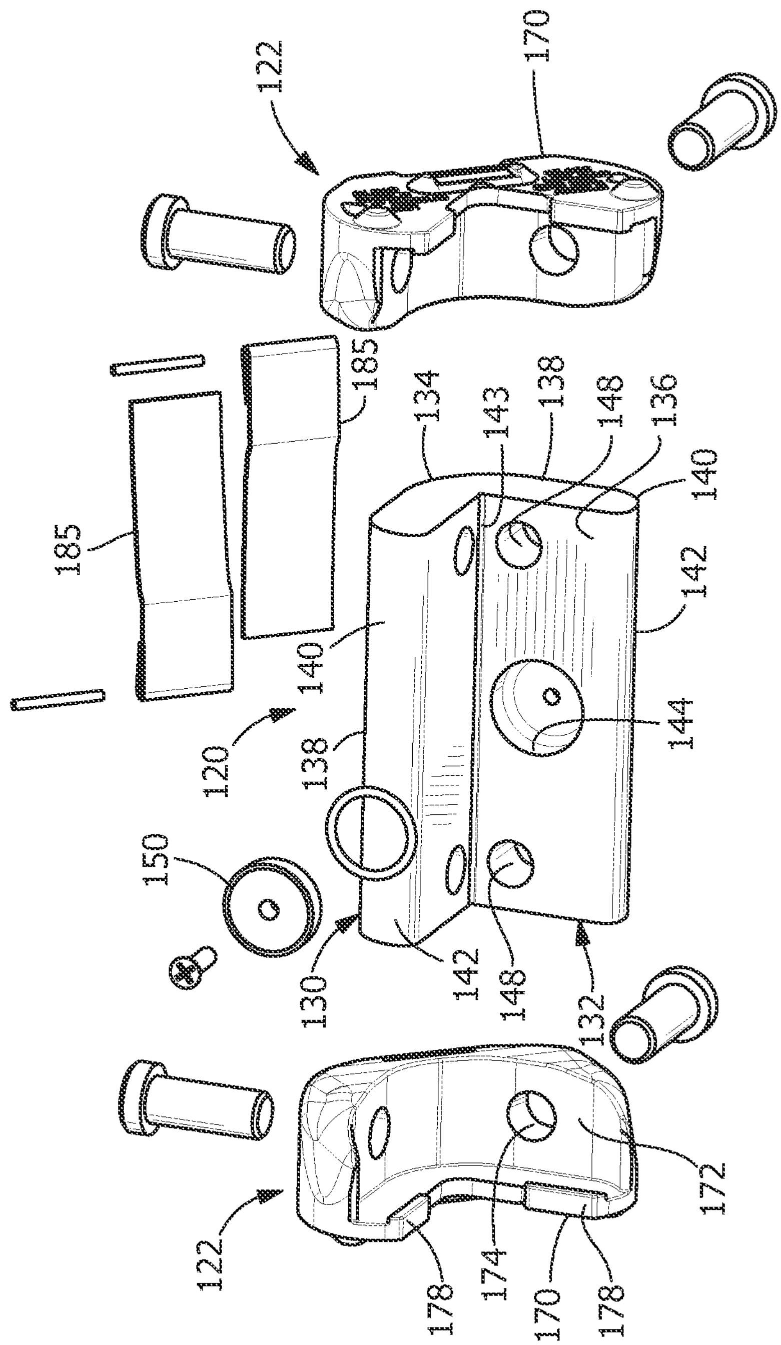
FIG. 9 is an exploded perspective view of the edge protector of FIG. 8.

As best shown in FIGS. 7 through 9, the center member 120 has a pair of flanges 130, 132 which extend from a curved or radiused center portion 134. In one illustrative embodiment, the radiused or curved center portion 134 has a radius of at least 3/16 of an inch. In another illustrative embodiment, the radiused or curved center portion 134 has a radius not larger than 2 inches.

Each flange 130, 132 has an inner surface 136 and an outer surface 138. A portion of the outer surface 138 of each flange 130, 132 is spaced from and is essentially parallel to inner surface 136 of the respective flange. An arcuate or slopped surface 140 is provided proximate a free end 142 of each flange 130, 132. The slopped surface 140 extends from the outer surface 138 to the inner surface 136. The inner surfaces 136 of the respective flanges 130, 132 intersect at point or line 143 (as best shown in FIGS. 8 and 9). In one illustrative embodiment, the distance between distance between the outside surface of the radiused or curved center portion 134 and the point or line 143 is equal to approximately one-half of the length of the outer surface of the radiused or curved center portion 134.

A recess or cavity 144 is provided in flanges 132. In the embodiment shown, the recess 144 extends from the inner surface 136 toward the outer surface 138. The recess 144 has a circular configuration and is provided proximate the center of flange 132, although other configurations can be used without departing from the scope of the invention. Openings 148 (FIG. 7) are provide at either end of the center member 120. The openings 148 extend through the outer surface 138 and through the inner surface 136 of the flanges 130, 132.

An insert 150 may be provided in either or the recess 144. In the embodiment shown, the insert 150 has magnetic characteristics which cooperate with various loads 12 to maintain the edge protector 110 in position prior to securing the lifting member 14 thereto. The shape of the insert 150 essentially conforms to the shape of the recess or cavity 144. However, other configurations of the insert 150 can be used without departing from the scope of the invention.

Various configurations of the center member 120 and the insert 150 may be used without departing from the scope of the invention. For example, recesses 144 may be provided in both flanges 130, 132 of center member 120.

Each end cap or end retainer 122 is positioned proximate the ends of the center member 120 of the edge protector 110. As best shown in FIG. 9, each end cap or end retainer 122 has a main body portion 170 with a recess 172 for receiving an end of the center member 120 therein. Openings 174 are provided in the body portion 170, the openings 174 configured to receiving dow rods 176 therein. The dow rods 176 cooperate with openings 48 of the center member and the openings 174 of the end cap or end retainer 122 to maintain the end cap or end retainer 122 in position on the center member 120.

End projections 178 (FIG. 9) extend from the body portion 170. The end projections 178 cooperate with the center member 120 to prevent the unwanted movement of the center member 120 relative to the end cap or end retainer 122 in the direction of the longitudinal axis of the center member 120.

Securing strip attachment members 184 (FIG. 7) are provided on the body portion 170. The attachment members 184 are configured to receive securing strips 185 therethrough. The securing strips is used to attach the lifting member 14 to the edge protector 110. This allows for ease of location of the edge protectors 110 when removed from the load 12. Many different configurations of the attachment member 84 can be used to allow the securing strips to cooperate therewith.

In operation, the inner surfaces 136 of the flanges 130, 132 of the edge protector 110 are placed proximate the load 12. In various embodiments, the edge protector 110 is held in place against the load by the insert 150. The lifting member 14 is then placed against the outer surface 138 of the edge protector 110 and tightly secured in position. The radiused or curved center portion 134 and the arcuate surfaces 140 prevent the lifting member 14 from being cut or damaged, as no sharp surfaces are present on the edge protector 110 which will engage the lifting member 14. The end retainers 122 located at each end of the edge protector 110 prevent the lifting member 14 from sliding off of the edge protector 110, thereby preventing damage to the lifting member 14 and the load 12. Once the load has been lifted to the particular desired location and the pressure is taken off of the lifting member 14, the edge protector 110 can be removed and reused. In various embodiments, the securing strips attached to the securing strip attachment members 184 of the edge protector 110 may prevent the lifting member 14 from being removed from the edge protector 110, such that when the pressure has been released from the lifting member 14, the edge protector 110 is removed from the load 12 but remains in proximity with the lifting member 14.

The edge protector 110 is configured to have a low profile to be inserted between a load 12 to be lifted and a lifting member 14, thereby facilitating the lifting of the load while not requiring significant additional space to be provided between adjacent loads. The edge protector 110 prevents damage to both the load 12 and the lifting member 14.

While the invention has been described with reference to the described embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An edge protector for insertion between a load to be lifted and a lifting member, the edge protector comprising:

- a load bearing, extruded compression member having a pair of flanges which extend from a radiused or curved center portion, with inner surfaces of the flanges oriented essentially perpendicular to each other, and
- retaining end caps affixed to ends of the compression member, each of the retaining end caps having body portions with recesses for receiving and maintaining the compression member in the retaining end caps.

2. The edge protector as recited in claim 1, wherein an arcuate surface is provided proximate a free end of each flange, the arcuate surface extends from an outer surface of each flange to the inner surface of each flange.

3. The edge protector as recited in claim 1, wherein a sloped surface is provided proximate a free end of each flange, the sloped surface extends from an outer surface of each flange to the inner surface of each flange.

4. The edge protector as recited in claim 1, wherein the inner surfaces of the respective flanges intersect at a line, the distance between an outside surface of the radiused or curved center portion and the line is equal to approximately one-half of a length of the outer surface of the radiused or curved center portion.

5. The edge protector as recited in claim 1, wherein the radiused or curved center portion has a radius of at least 3/16 of an inch.

6. The edge protector as recited in claim 1, wherein the radiused or curved center portion has a radius not larger than 2 inches.

7. The edge protector as recited in claim 1, wherein at least one recess is provided in each respective flange of the pair of flanges, each of the at least one recess extends from the inner surface toward an outer surface of each respective flange.

8. The edge protector as recited in claim 7, wherein an insert is provided in at least one of the recesses, the insert provides a resilient surface which cooperates with and engages the load while providing sufficient resiliency to conform to the load, thereby helping to prevent damage to the load.

9. The edge protector as recited in claim 8, wherein the insert has an inner rubber core and an outer plastic cover.

10. The edge protector as recited in claim 7, wherein an attachment member is provided in at least one of the recesses, the attachment member having magnetic characteristics which cooperate with the load to maintain the edge protector in position prior to securing the lifting member thereto.

11. The edge protector as recited in claim 10, wherein the attachment member has one or more magnets.

12. The edge protector as recited in claim 1, wherein each flange has an outer surface, a portion of each respective outer surface of each flange is spaced from and is essentially parallel to the inner surface of the respective flange.

13. The edge protector as recited in claim 1, wherein the end caps cooperate with the lifting member to prevent the lifting member from sliding off of the edge protector.

14. The edge protector as recited in claim 1, wherein securing strip attachment members extend from the end caps, the securing strip attachment members are configured to receive securing strips therethrough, the securing strips attached to the securing strip attachment members of the edge protector to prevent the lifting member from being removed from the edge protector, such that when pressure has been released from the lifting member, the edge protector is removed from the load but remains in proximity with the lifting member.

15. An edge protector for insertion between a load to be lifted and a lifting member, the edge protector comprising:

a load bearing, extruded compression member having a pair of flanges which extend from a radiused or curved center portion, with inner surfaces of the flanges oriented essentially perpendicular to each other, and retaining end caps affixed to ends of the compression member;

at least one recess provided in each respective flange of the pair of flanges, each of the at least one recess extends from the inner surface toward an outer surface of each respective flange;

an insert provided in at least one of the recesses, the insert provides a resilient surface which cooperates with and engages the load while providing sufficient resiliency to conform to the load, thereby helping to prevent damage to the load.

16. The edge protector as recited in claim 15, wherein the insert has an inner rubber core and an outer plastic cover.

17. An edge protector for insertion between a load to be lifted and a lifting member, the edge protector comprising:

a load bearing, extruded compression member having a pair of flanges which extend from a radiused or curved center portion, with inner surfaces of the flanges oriented essentially perpendicular to each other, and retaining end caps affixed to ends of the compression member;

at least one recess provided in each respective flange of the pair of flanges, each of the at least one recess extends from the inner surface toward an outer surface of each respective flange;

an attachment member provided in the at least one of the recesses, the attachment member having magnetic characteristics which cooperate with the load to maintain the edge protector in position prior to securing the lifting member thereto.

18. The edge protector as recited in claim 17, wherein the attachment member has one or more magnets.

* * * * *